(12) United States Patent
Eastoe et al.

(10) Patent No.: US 12,302,872 B2
(45) Date of Patent: May 20, 2025

(54) FARMING SYSTEM FOR USE IN AQUACULTURE

(71) Applicants: Siemens Energy AS, Oslo (NO); Siemens Energy Limited, Newcastle upon Tyne (GB)

(72) Inventors: Andrew Robert Eastoe, Urangsvåg (NO); Thomas Ferry, Dundee (GB)

(73) Assignees: SIEMENS ENERGY AS, Oslo (NO); SIEMENS ENERGY LIMITED, Newcastle upon Tyne (GB)

( * ) Notice: Subject to any disclaimer, the term of this patent is extended or adjusted under 35 U.S.C. 154(b) by 10 days.

(21) Appl. No.: 18/403,879

(22) Filed: Jan. 4, 2024

(65) Prior Publication Data
US 2024/0224955 A1     Jul. 11, 2024

(30) Foreign Application Priority Data
Jan. 11, 2023 (GB) ...................... 2300381

(51) Int. Cl.
*A01K 61/60* (2017.01)
*A01K 61/10* (2017.01)

(52) U.S. Cl.
CPC .............. *A01K 61/60* (2017.01); *A01K 61/10* (2017.01)

(58) Field of Classification Search
CPC ................ A01K 61/10; A01K 61/60
See application file for complete search history.

(56) References Cited

U.S. PATENT DOCUMENTS

2021/0262877 A1   8/2021   Hansen
2021/0360905 A1* 11/2021   Van Leeuwen ........ A01K 61/65
(Continued)

FOREIGN PATENT DOCUMENTS

CN    212728468 U    3/2021
CN    214482823 U    10/2021
(Continued)

*Primary Examiner* — Joshua J Michener
*Assistant Examiner* — Henry Hooper Mudd

(57) ABSTRACT

A farming system for use in water-based farming of a product includes a structural frame arranged to define a farming cell. The structural frame includes a first edge member, a second edge member vertically offset from the first edge member, a third edge member extending between the first edge member and the second edge member, and a fourth edge member offset from the third edge member and extending between the first edge member and the second edge member. The first edge member, the second edge member, the third edge member, and the fourth edge member, cooperate to define a first wall perimeter. The farming system also includes a plurality of cable assemblies coupled to the first edge member. Each cable assembly includes a cable having a first end and a second end with the second end fixedly attached to the second edge member. A cable tensioner is coupled to the first edge member and the first end of the cable, and a sensor is coupled to the cable and operable to measure a tension level of the cable. The farming system also includes a controller operable to receive a signal indicative of the tension level of each cable from each sensor and to operate each of the cable tensioners in response to the associated tension level to maintain the tension level of each associated cable within a desired range.

20 Claims, 2 Drawing Sheets

(56) References Cited

U.S. PATENT DOCUMENTS

2021/0400927 A1* 12/2021 Osterhus ................ A01K 61/60
2022/0174918 A1*  6/2022 Fitzgerald ............. A01K 61/65
2024/0164352 A1*  5/2024 Eide ...................... A01K 61/65

FOREIGN PATENT DOCUMENTS

| CN | 111758681 B    | 12/2021 |
| WO | 2006052146 A1  |  5/2006 |
| WO | 2021255714 A1  | 12/2021 |

* cited by examiner

FARMING SYSTEM FOR USE IN AQUACULTURE

BACKGROUND

Aquaculture is a growing business in which fish or other products are grown in a large body of water such as an ocean or lake. Many of these aquaculture systems are positioned in deep-sea areas such as the North Sea or the Atlantic Ocean where weather, tides, and animals can be a concern. Fish or other product can escape from aquaculture farms due to damage caused by weather or these other sources. As an example, approximately seventy-five percent of all fish escapes from fish farms are related to holes or tears in the containment nets. Increasing the integrity of these subsurface nets has always been a challenge.

Fish escapes may lead to high financial losses and a potential mixing of farmed fish or product with the natural wild stocks. This mixing can introduce disease and genetic problems to the natural wild stocks. It is expected that future aquaculture will include larger farms and may be positioned further out to sea, with these fish farms holding more product and being exposed to harsher conditions, product escape events will only grow and be scrutinized more closely.

BRIEF SUMMARY

In one aspect, a farming system for use in water-based farming of a product includes a structural frame arranged to define a farming cell. The structural frame includes a first edge member, a second edge member vertically offset from the first edge member, a third edge member extending between the first edge member and the second edge member, and a fourth edge member offset from the third edge member and extending between the first edge member and the second edge member. The first edge member, the second edge member, the third edge member, and the fourth edge member, cooperate to define a first wall perimeter. The farming system also includes a plurality of cable assemblies coupled to the first edge member. Each cable assembly includes a cable having a first end and a second end with the second end fixedly attached to the second edge member. A cable tensioner is coupled to the first edge member and the first end of the cable, and a sensor is coupled to the cable and operable to measure a tension level of the cable. The farming system also includes a controller operable to receive a signal indicative of the tension level of each cable from each sensor and to operate each of the cable tensioners in response to the associated tension level to maintain the tension level of each associated cable within a desired range.

The farming system may also include a net coupled to the cables and cooperating with the first edge member, the second edge member, the third edge member, and the fourth edge member to define a wall with openings sized to inhibit the passage of the product.

The controller of the farming system may also be operable to indicate a cable failure when the tension level of the cable falls below a failure value.

The desired range of the tension level in the farming system may be between fifteen and seventy-five percent of a tensile strength of the cable.

In another aspect, a farming system for use in water-based farming of a product includes a central hub extending vertically from a top end disposed above a water line to a bottom end disposed below the water line. A plurality of upper spokes is disposed near the top end of the central hub with each upper spoke extending radially outward from the central hub, a plurality of lower spokes is disposed near the bottom end of the central hub with each lower spoke extending radially outward from the central hub. A first cable and a second cable are each fixedly attached to a first lower spoke, a first sensor is coupled to the first cable and is operable to measure a first tension level of the first cable, and a second sensor is coupled to the second cable and is operable to measure a second tension level of the second cable. A first cable tensioner is coupled to the first cable and is operable to continuously adjust the first tension level in response to the measured first tension level to maintain the first tension level in a desired range, and a second cable tensioner is coupled to the second cable and is operable to continuously adjust the second tension level in response to the measured second tension level to maintain the second tension level in the desired range.

The farming system may also include a net coupled to the first cable and the second cable and cooperating with the upper spoke and the lower spoke to define a wall with openings sized to inhibit the passage of the product.

The controller of the farming system may be operable to receive a signal from the first sensor and a signal from the second sensor, and may be operable to control the operation of the first cable tensioner in response to the signal from the first sensor and to control the second cable tensioner in response to the signal from the second sensor.

The desired range of the tension level may be between fifteen and seventy-five percent of a tensile strength of the cable.

In another aspect, a method of operating a water-based farming system includes extending a lower spoke and an upper spoke from a central hub to partially define a wall of a farming cell and connecting a first end of a first cable and a first end of a second cable to the lower spoke. The method also includes connecting a second end of the first cable to a first cable tensioner, connecting a second end of the second cable to a second cable tensioner, measuring a tension of the first cable, and measuring a tension of the second cable. The method further includes operating the first cable tensioner continuously in response to the measured tension of the first cable to maintain the measured tension of the first cable within a desired range, and operating the second cable tensioner continuously in response to the measured tension of the second cable to maintain the measured tension of the second cable within the desired range.

The method may also include providing a first signal from a first sensor that operates to measure the tension of the first cable to a controller, the controller operable to adjust the tension of the first cable using the first cable tensioner in response to the first signal.

The desired range of the tension level may be between fifteen and seventy-five percent of a tensile strength of the cable.

The method may also include providing a second signal from a second sensor that operates to measure the tension of the second cable to the controller, the controller operable to adjust the tension of the second cable using the second cable tensioner in response to the second signal.

The method may also include comparing the measured tension of the first cable to a failure value and indicating a failure when the measured tension falls below the failure value, where the failure value is between zero and five percent of a tensile strength of the first cable.

The structural frame may be arranged to define a farming system having a plurality of farming cells, and where each farming cell is wedge-shaped.

The controller of the farming system may be operable to indicate a cable failure when the tension level of the cable falls below a failure value.

The failure value of the farming system may be between zero and five percent of a tensile strength of the cable.

BRIEF DESCRIPTION OF THE DRAWINGS

To easily identify the discussion of any particular element or act, the most significant digit or digits in a reference number refer to the figure number in which that element is first introduced.

DETAILED DESCRIPTION

Figure 1:
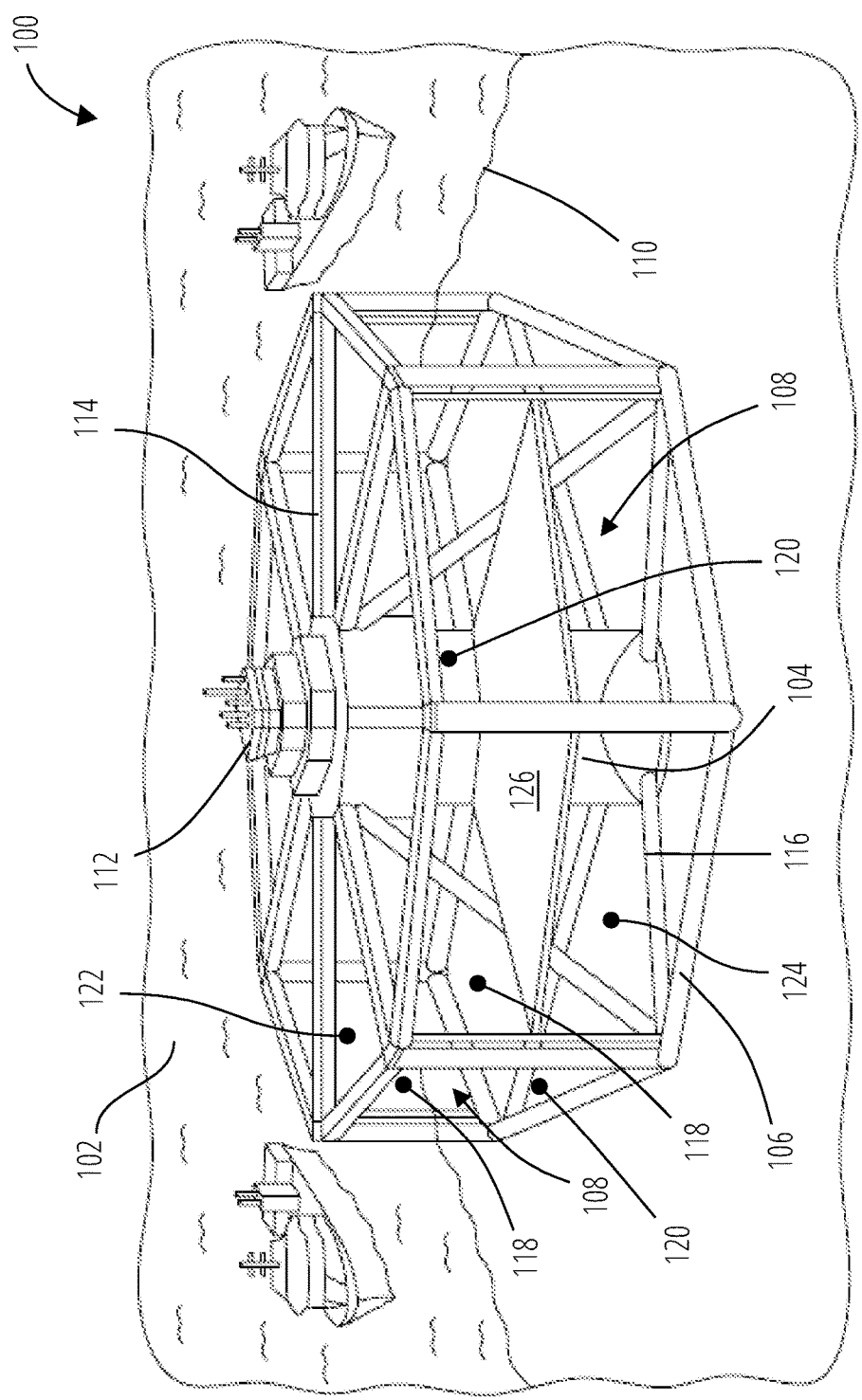
FIG. 1 is a perspective view of an aquaculture farming system including a plurality of farming cells.

Before any embodiments of the invention are explained in detail, it is to be understood that the invention is not limited in its application to the details of construction and the arrangement of components set forth in this description or illustrated in the following drawings. The invention is capable of other embodiments and of being practiced or of being carried out in various ways. Also, it is to be understood that the phraseology and terminology used herein is for the purpose of description and should not be regarded as limiting. Furthermore, while multiple embodiments or constructions may be described herein, any features, methods, steps, components, and the like described with regard to one embodiment are equally applicable to other embodiments absent a specific statement to the contrary.

Various technologies that pertain to systems and methods will now be described with reference to the drawings, where like reference numerals represent like elements throughout. The drawings discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged apparatus. It is to be understood that functionality that is described as being carried out by certain system elements may be performed by multiple elements. Similarly, for instance, an element may be configured to perform functionality that is described as being carried out by multiple elements. The numerous innovative teachings of the present application will be described with reference to exemplary non-limiting embodiments.

While terms such as "first", "second", "third" and so forth may be used herein to refer to various elements, information, functions, or acts, these elements, information, functions, or acts should not be limited by these terms. Rather these numeral adjectives are used to distinguish different elements, information, functions or acts from each other. For example, a first element, information, function, or act could be termed a second element, information, function, or act, and, similarly, a second element, information, function, or act could be termed a first element, information, function, or act, without departing from the scope of the present disclosure.

In addition, the term "adjacent to" may mean that an element is relatively near to but not in contact with a further element or that the element is in contact with the further portion, unless the context clearly indicates otherwise. Further, the phrase "based on" is intended to mean "based, at least in part, on" unless explicitly stated otherwise. Terms "about" or "substantially" or like terms are intended to cover variations in a value that are within normal industry manufacturing tolerances for that dimension. If no industry standard is available, a variation of twenty percent would fall within the meaning of these terms unless otherwise stated.

FIG. 1 illustrates a farming system 100 suitable for use to raise or farm products in a body of water 102 such as an ocean or lake. The farming system 100 of FIG. 1 is particularly suited to raising fish in a large body of water such as the North Sea or the Atlantic Ocean. Of course, other products such as shellfish, or plant-based products could also be farmed in the farming system 100 of FIG. 1. In addition, while the farming system 100 is well-suited for the particular environment offshore, it could also be employed in smaller bodies of water or near the shore (e.g., in a bay or other confined body).

The farming system 100 includes a central hub 104 and a structural frame 106 that are arranged to define a plurality of farming cells 108. The central hub 104 is a cylindrical member having a central axis that extends vertically. The central hub 104 is arranged such that a portion extends above a waterline 110. In the illustrated construction, a control room 112 or other space is positioned on top of the central hub 104 to provide space for workers, operators, and the like.

The structural frame 106 is formed from various structural members that are arranged to define a perimeter for each of the farming cells 108. In the illustrated construction, the structural frame 106 includes a plurality of upper spokes 114 and a plurality of lower spokes 116 with each upper spoke 114 and lower spoke 116 extending radially outward from the central hub 104. The upper spokes 114 and lower spokes 116 cooperate with the remainder of the structural frame 106 to define eight substantially identical farming cells 108. Each of the farming cells 108 is wedge-shaped with a narrow end near the central hub 104 and a wide end at the radially outermost portion of the farming cell 108. This arrangement produces two rectangular side walls 118, a rectangular end wall 120, a trapezoidal or wedge-shaped top wall 122 and a similarly shaped bottom wall 124 for each of the farming cells 108. The central hub 104 forms a narrow end wall 120 for each farming cell 108 near the narrow end. Of course, other arrangements of the farming system 100 and/or each of the farming cells 108 could be employed. For example, cubic farming cells could be employed or more or fewer farming cells could be formed as desired.

In the illustrated construction, one or more of the farming cells 108 may be provided with a movable wall 126. The movable wall 126 can be positioned at some intermediate position within the farming cell 108 to divide the farming cell 108. In addition, the movable wall 126 could be movable to herd the product into a particular space or location for removal, harvesting, or other purposes.

The central hub 104, structural frame 106, and any other components that form the farming system 100 are selected to provide sufficient buoyancy to assure that a portion of the farming system 100 always remains above the waterline 110. The farming system 100 may be anchored or moored in a desired position or may include a drive and steering system that allows an operator to maintain the farming system 100 in a desired position or to move the farming system 100 as may be required.

As illustrated in FIG. 1, the structural frame 106 is arranged to define the perimeter of various walls that cooperate to define each farming cell 108. However, in order to farm product, and in particular fish, each of the walls, with the possible exception of the top wall 122 must be enclosed using wall enclosures 200 that contain the product being farmed. However, the wall enclosures 200 should include openings that are small enough to inhibit the unwanted escape of the product while also allowing for the passage of water.

Figure 2:
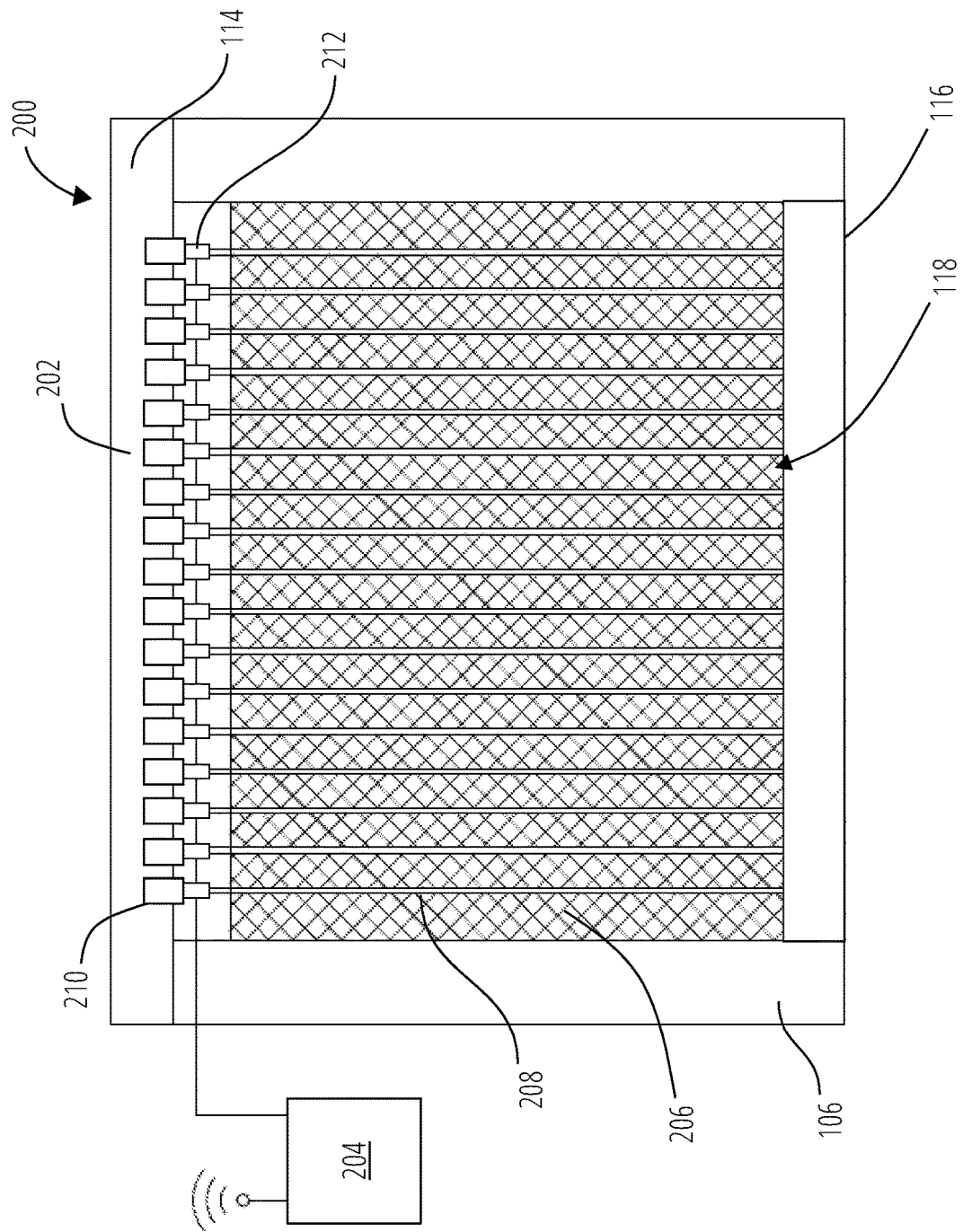
FIG. 2 is a schematic illustration of a wall suitable for use to partially enclose each of the farming cells.

FIG. 2 illustrates one arrangement of the wall enclosure 200 that could be used to enclose the side walls 118, the end walls 120, the bottom wall 124, and even the top wall 122 if desired. Specifically, FIG. 2 illustrates the wall enclosure 200 arranged to cover one of the side walls 118.

The wall enclosure 200 includes a plurality of cable assemblies 202, a controller 204, and a net 206 arranged between the upper spoke 114 and the lower spoke 116 that partially define the perimeter of the side wall 118 that is being covered by the wall enclosure 200. The net 206 is selected to provide the necessary through flow while still adequately containing the product being farmed. The pattern of the net 206, as well as the material used to form the net 206 are not critical to the invention but rather are selected based on the specific product being farmed as well as the expected location of the farming system 100 during operation.

Each cable assembly 202 includes a cable 208, a cable tensioner 210, and a sensor 212. Each cable 208 includes a first end that is fixedly attached to the lower spoke 116 and a second end that extends to a point near or beyond the upper spoke 114. The term "fixedly attached" in this context means that the cable 208 is attached to the lower spoke 116 in a manner that does not allow free movement toward the upper spoke 114. However, some movement with respect to the lower spoke 116 (e.g., circumferentially around the lower spoke 116, or axially along the lower spoke 116) may be possible while still being "fixedly attached" to the lower spoke 116. The cable 208 could include a multi-strand or braided cable or a single filament cable as may be desired for the application. Additionally, any suitable material could be employed and should be selected based on the particular application. Thus, steel, nylon, rope, or any other material may be suitable for use in forming the cable 208 or the net 206.

Each sensor 212 is attached to or otherwise coupled to its respective cable 208 in a manner that allows the sensor 212 to measure one of a tension level or a strain level of the cable 208 and to transmit or output a signal indicative of the tension level. Suitable sensors 212 could include load cells that directly or indirectly measure the load, and therefore the tension level on the cable 208, or strain measuring devices that measure the strain on the cable 208 which can then be converted to the tension level.

Each cable tensioner 210 is connected to the second end of its respective cable and to the upper spoke 114 and operates to maintain the tension level of its respective cable at a desired value or within a desired range. The cable tensioner 210 may be motor driven (i.e., electrical) or may include hydraulic or pneumatic actuators that operate to vary and control the tension level of each cable 208. In the illustrated construction, each cable tensioner 210 operates in response to a control signal from the controller 204 to maintain the tension level of its respective cable 208.

The controller 204 includes a micro-processor based or other computer controller that can receive inputs including signals from each of the sensors 212 and produce outputs such as the control signals that control the operation of the cable tensioners 210. Suitable controllers 204 include large scale controllers such as SCADA systems, computer controllers, PC-based controllers, programmable logic controllers (PLC), and the like. In addition, non-computer-based controllers could also be employed as desired.

The net 206 attaches to the cables 208 in a manner that allows movement of the net 206 without significant stress or strain but that maintains the integrity of the wall enclosure 200. Each side wall 118 and the outer end wall 120 include a similar wall enclosure 200. In addition, a similar wall enclosure 200 may be used on the bottom wall 124 and/or the top wall 122 if desired.

In use, each of the farming cells 108 is formed from the structural frame 106, a number of wall enclosures 200, and other nets 206 or walls as may be required. Each farming cell 108 illustrated in FIG. 1 includes two side walls 118 that include wall enclosures 200.

The wall enclosures 200 for the side walls 118 are formed by positioning each of the cables 208 with one end fixed to the lower spoke 116 and the opposite end connected to a cable tensioner 210 that is in turn connected to the upper spoke 114. Each sensor 212 is coupled to one of the cables 208 to allow the continuous or periodic measurement of the tension level of each cable 208. A signal indicative of the tension level is sent to the controller 204 to allow the controller to monitor the tension and to generate individual control signals for each cable tensioner 210 to maintain the tension level of the cables 208 within a desired range. In one construction, the tension level for each cable 208 is maintained between fifteen percent and seventy-five percent of the tensile strength (i.e., yield strength or failure strength) of the cable 208. Of course, other desired ranges are also possible. The net 206 is then connected to the cables 208 to complete the wall enclosure 200.

It is preferred that the cable tensioner 210 and the sensor 212 for each of the cable assemblies 202 be positioned above the waterline 110 and either in or out of the splash zone of the farming system 100. In this position, the cable tensioner 210 and the sensor 212 are not exposed to significant contact with water which reduces the likelihood of damage or unanticipated failures.

The controller 204 is also operable to detect the failure of the cables 208. If a cable 208 fails, the tension level of the particular cable drops substantially. For example, a tension level below five percent of the tensile strength of the cable 208 would be indicative of a failed cable 208. The controller 204 could generate an alarm and indicate which cable 208 has failed, which greatly reduces the time that the farming cell 108 operates with damage that might allow for the escape of the product.

The farming system 100 illustrated and described herein is specifically applicable to large scale offshore aquaculture farms with the farming system 100 designed to be much more robust and able to cope with the large wave heights and high winds seen during a typical North Atlantic winter.

Each sensor 212 constantly measures the tension level of the cable 208 and any vibration applied to the cable 208. Each sensor 212 and cable tensioner 210 are connected to the controller 204 to enable the operator of the farming system 100 to view measurements applied to each wall enclosure 200 of the farming system 100 and obtain a warning if an abnormal situation occurs with the net 206 or any part of the wall enclosure 200. A break in the net 206 or in one of the cables 208 results in a change of tension that is detected by one or more of the sensors 212 and displayed to the operator of the farming system 100 via the controller 204. Each cable assembly 202 also has the functionality to increase or decrease the tension level of its associated cable 208, in turn relaxing or tensioning the complete net 206. This is especially important in strong tides or high winds, as the ability to control the tension level can reduce the likelihood of a failure of the net 206 or the cables 208. The controller 204 can also detect vibrations as rapid changes in tension levels of the cables 208. These vibrations can indicate attacks from outside of the net 206 via a predator or something else such as an underwater vehicle.

Although an exemplary embodiment of the present disclosure has been described in detail, those skilled in the art will understand that various changes, substitutions, variations, and improvements disclosed herein may be made without departing from the spirit and scope of the disclosure in its broadest form.

None of the description in the present application should be read as implying that any particular element, step, act, or function is an essential element, which must be included in the claim scope: the scope of patented subject matter is defined only by the allowed claims. Moreover, none of these claims are intended to invoke a means plus function claim construction unless the exact words "means for" are followed by a participle.

What is claimed is:

1. A farming system for use in water-based farming of a product, the farming system comprising:
    a structural frame arranged to define a farming cell, the structural frame including a first edge member, a second edge member vertically offset from the first edge member, a third edge member extending between the first edge member and the second edge member, and a fourth edge member offset from the third edge member and extending between the first edge member and the second edge member, the first edge member, the second edge member, the third edge member, and the fourth edge member, cooperating to define a first wall perimeter;
    a plurality of cable assemblies coupled to the first edge member, each cable assembly comprising:
        a cable having a first end and a second end, the second end fixedly attached to the second edge member;
        a cable tensioner coupled to the first edge member and the first end of the cable; and
        a sensor coupled to the cable and operable to measure a tension level of the cable; and
    a controller operable to receive a signal indicative of the tension level of each cable from each sensor and to operate each of the cable tensioners in response to the associated tension level to maintain the tension level of each associated cable within a desired range.

2. The farming system of claim 1, further comprising a net coupled to the cables and cooperating with the first edge member, the second edge member, the third edge member, and the fourth edge member to define a wall with openings sized to inhibit the passage of the product.

3. The farming system of claim 2, wherein the structural frame defines a plurality of farming cells, and wherein each farming cell is wedge-shaped.

4. The farming system of claim 3, wherein the wall is a first wall of the farming cell, the farming cell further comprising a second wall, an end wall, and a bottom wall, each including openings sized to inhibit the passage of the product.

5. The farming system of claim 1, wherein the controller is operable to indicate a cable failure when the tension level of the cable falls below a failure value.

6. The farming system of claim 5, wherein the failure value is between zero and five percent of a tensile strength of the cable.

7. The farming system of claim 1, wherein the desired range is between fifteen and seventy-five percent of a tensile strength of the cable.

8. A farming system for use in water-based farming of a product, the farming system comprising:
    a central hub extending vertically from a top end disposed above a water line to a bottom end disposed below the water line;
    a plurality of upper spokes disposed near the top end of the central hub, each upper spoke extending radially outward from the central hub;
    a plurality of lower spokes disposed near the bottom end of the central hub, each lower spoke extending radially outward from the central hub;
    a first cable and a second cable each fixedly attached to a first lower spoke;
    a first sensor coupled to the first cable and operable to measure a first tension level of the first cable;
    a second sensor coupled to the second cable and operable to measure a second tension level of the second cable;
    a first cable tensioner coupled to the first cable and operable to continuously adjust the first tension level in response to the measured first tension level to maintain the first tension level in a desired range; and
    a second cable tensioner coupled to the second cable and operable to continuously adjust the second tension level in response to the measured second tension level to maintain the second tension level in the desired range.

9. The farming system of claim 8, further comprising a net coupled to the first cable and the second cable and cooperating with the upper spoke and the lower spoke to define a wall with openings sized to inhibit the passage of the product.

10. The farming system of claim 9, wherein the central hub, the plurality of lower spokes, and the plurality of upper spokes cooperate to partially define a plurality of farming cells, and wherein each farming cell is wedge-shaped.

11. The farming system of claim 10, wherein the wall is a first wall of the farming cell, the farming cell further comprising a second wall, an end wall, and a bottom wall, each including openings sized to inhibit the passage of the product.

12. The farming system of claim 8, further comprising a controller operable to receive a signal from the first sensor and a signal from the second sensor, the controller operable to control the operation of the first cable tensioner in response to the signal from the first sensor and to control the second cable tensioner in response to the signal from the second sensor.

13. The farming system of claim 12, wherein the controller is operable to indicate a cable failure when the tension level of the cable falls below a failure value.

14. The farming system of claim 13, wherein the failure value is between zero and five percent of a tensile strength of the cable.

15. The farming system of claim 8, wherein the desired range is between fifteen and seventy-five percent of a tensile strength of the cable.

16. A method of operating a water-based farming system, the method comprising:
    extending a lower spoke and an upper spoke from a central hub to partially define a wall of a farming cell;
    connecting a first end of a first cable and a first end of a second cable to the lower spoke;
    connecting a second end of the first cable to a first cable tensioner;

connecting a second end of the second cable to a second cable tensioner;

measuring a tension of the first cable;

measuring a tension of the second cable;

operating the first cable tensioner continuously in response to the measured tension of the first cable to maintain the measured tension of the first cable within a desired range; and operating the second cable tensioner continuously in response to the measured tension of the second cable to maintain the measured tension of the second cable within the desired range.

17. The method of claim 16, further comprising providing a first signal from a first sensor that operates to measure the tension of the first cable to a controller, the controller operable to adjust the tension of the first cable using the first cable tensioner in response to the first signal.

18. The method of claim 17, further comprising providing a second signal from a second sensor that operates to measure the tension of the second cable to the controller, the controller operable to adjust the tension of the second cable using the second cable tensioner in response to the second signal.

19. The method of claim 17, further comprising comparing the measured tension of the first cable to a failure value and indicating a failure when the measured tension falls below the failure value, wherein the failure value is between zero and five percent of a tensile strength of the first cable.

20. The farming system of claim 16, wherein the desired range is between fifteen and seventy-five percent of a tensile strength of the cable.

\* \* \* \* \*